(12) United States Patent
Andersson et al.

(10) Patent No.: US 9,361,346 B2
(45) Date of Patent: Jun. 7, 2016

(54) MAPPING INFORMATION STORED IN A LDAP TREE STRUCTURE TO A RELATIONAL DATABASE STRUCTURE

(75) Inventors: Johan Er Andersson, Stockholm (SE); Mikael U. Ronstrom, Hagersten (SE)

(73) Assignee: Oracle America, Inc., Redwood City, CA (US)

(*) Notice: Subject to any disclaimer, the term of this patent is extended or adjusted under 35 U.S.C. 154(b) by 1777 days.

(21) Appl. No.: 12/423,139

(22) Filed: Apr. 14, 2009

(65) Prior Publication Data
US 2010/0262631 A1   Oct. 14, 2010

(51) Int. Cl.
G06F 7/00 (2006.01)
G06F 17/30 (2006.01)

(52) U.S. Cl.
CPC .... *G06F 17/30569* (2013.01); *G06F 17/30607* (2013.01); *G06F 17/30589* (2013.01); *G06F 17/30595* (2013.01)

(58) Field of Classification Search
CPC ........ G06F 17/30–17/30067; G06F 17/30023; G06F 17/30569; G06F 17/30607
USPC .......................................... 707/103, 101, 100
See application file for complete search history.

(56) References Cited

U.S. PATENT DOCUMENTS

| | | | | |
|---|---|---|---|---|
| 6,016,499 | A * | 1/2000 | Ferguson | G06F 17/30569 |
| 6,085,188 | A | 7/2000 | Bachmann et al. | |
| 6,834,286 | B2 | 12/2004 | Srinivasan et al. | |
| 2002/0078068 | A1* | 6/2002 | Krishnaprasad | G06F 17/30595 |
| 2003/0033277 | A1* | 2/2003 | Bahulkar | G06F 17/30607 |
| 2003/0208505 | A1* | 11/2003 | Mullins | G06F 17/30607 |
| 2004/0117379 | A1* | 6/2004 | Khatchatrian | G06F 17/30592 |
| 2004/0148305 | A1* | 7/2004 | Bollich | G06F 17/30569 |
| 2005/0080792 | A1* | 4/2005 | Ghatare | G06F 17/30569 |
| 2005/0102262 | A1* | 5/2005 | Nuebling | G06F 17/30607 |
| 2005/0131926 | A1* | 6/2005 | Chakraborty | G06F 17/30917 |
| 2006/0117049 | A1* | 6/2006 | Jain et al. | 707/101 |
| 2008/0189304 | A1* | 8/2008 | Rowley | G06F 17/30607 |
| 2009/0055518 | A1* | 2/2009 | Auvenshine | G06F 17/30575 709/223 |
| 2009/0271345 | A1* | 10/2009 | Rich | G06F 17/30607 706/46 |
| 2013/0173664 | A1* | 7/2013 | Xue | G06F 17/30 707/792 |

OTHER PUBLICATIONS

Tom Wetzel, Macromedia Breeze, Best Practices for Breeze Directory Service Integration, 2005, pp. 1-24.*
Francesco Tornieri, OpenLDAP with Linux and Windows, 2002, pp. 1-10.*
Spectrum SCMv3.0, 15 LDAP Support for SpectrumSCM, 2008, pp. (15-1)-(15-7).*

* cited by examiner

*Primary Examiner* — Thuy Dao
*Assistant Examiner* — Mongbao Nguyen
(74) *Attorney, Agent, or Firm* — Marsh Fischmann & Breyfogle LLP; Jonathon A. Szumny (57) ABSTRACT

A method for mapping an information directory such as a LDAP directory tree to a relational database structure. The method includes accessing an information directory, which has a number of data entries at nodes of its tree structure and each of these entries may include a number of attributes defined by one or more object classes. The method includes storing a distinguished name (DN2ID) index table including generating records the data entries that include a DN field containing the entry's attributes. The method includes forming a relational table associated with each of the object classes defined for the information directory, and the records of the relational tables may be linked to the records/entries of the DN2ID index table. The method may include determining an entry identifier for each of the entries of the directory and storing these in the records of the DN2ID index table and in the relational tables.

32 Claims, 7 Drawing Sheets

DN2ID INDEX TABLE (600)

| A0 | A1 | A2 | A3 | AXX | OC | MV | EID |
|---|---|---|---|---|---|---|---|
| DC=EXAMPLE | | | | ... | TOP ORGANIZATIONALPERSON DOMAINRELATEDOBJEC DCOBJECT | 0 | 1 |
| DC=EXAMPLE | OU=PEOPLE | | | ... | TOP ORGANIZATION | 0 | 2 |
| DC=EXAMPLE | OU=PEOPLE | OU=IT STAFF | | ... | TOP ORGANIZATION | 0 | 3 |
| DC=EXAMPLE | OU=PEOPLE | OU=IT STAFF | CN=BOB | ... | TOP ORGANIZATIONALPERSON INETORGPERSON | 1 | 4 |
| DC=EXAMPLE | OU=PEOPLE | OU=IT STAFF | CN=JANE | ... | TOP ORGANIZATIONALPERSON INETORGPERSON | 0 | 5 |
| DC=EXAMPLE | OU=PEOPLE | OU=SALES STAFF | | ... | TOP ORGANIZATION | 0 | 6 |

DN -- DISTINGUISHED NAME

620 — MATCH ON PK (A0 ... AXX)

MAPPING INFORMATION STORED IN A LDAP TREE STRUCTURE TO A RELATIONAL DATABASE STRUCTURE

BACKGROUND OF THE INVENTION

1. Field of the Invention

The present invention relates, in general, to methods and systems for managing data storage in tables aid databases, and, more particularly, to methods and systems for mapping information in a tree structure, such as that found in an information directory to a relational database structure or relational table to facilitate searching and other data access using database management system techniques.

2. Relevant Background

In the data storage industry, there are many applications where data is stored in the form of an information directory. For example, information directories are particularly useful for storing information that is read often from many locations or many clients over a network and is updated infrequently. Examples of information that may be stored in information directories include: company employee information such as phone books, organization charts, and so on; external customer contact information; equipment or other inventories; and other sets of data that are readily optimized for read-intensive operations.

A commonly implemented information directory is a lightweight Directory Access Protocol (LDAP) directory. The LDAP is an application protocol for querying and modifying directory services running over TCP/IP. In LDAP, a directory is a set of objects with similar attributes organized in a logical and hierarchical manner. The most common example is a telephone directory, which includes a series of names (e.g., either of persons or organizations) organized alphabetically, with each name having an address and phone number attached. Due to this basic design, LDAP is often used by other services for authentication. LDAP directory servers store their data hierarchically in a tree structure with each node of the tree being a record or entry of the directory. An LDAP directory tree often reflects various political, geographic, and/or organizational boundaries, depending on the model chosen. LDAP deployments today tend to use Domain Name System (DNS) names for structuring the topmost levels of the hierarchy. Deeper inside the directory might appear entries representing people, organizational units, printers, documents, groups of people or anything else that represents a given tree entry or multiple entries.

Figure 1:
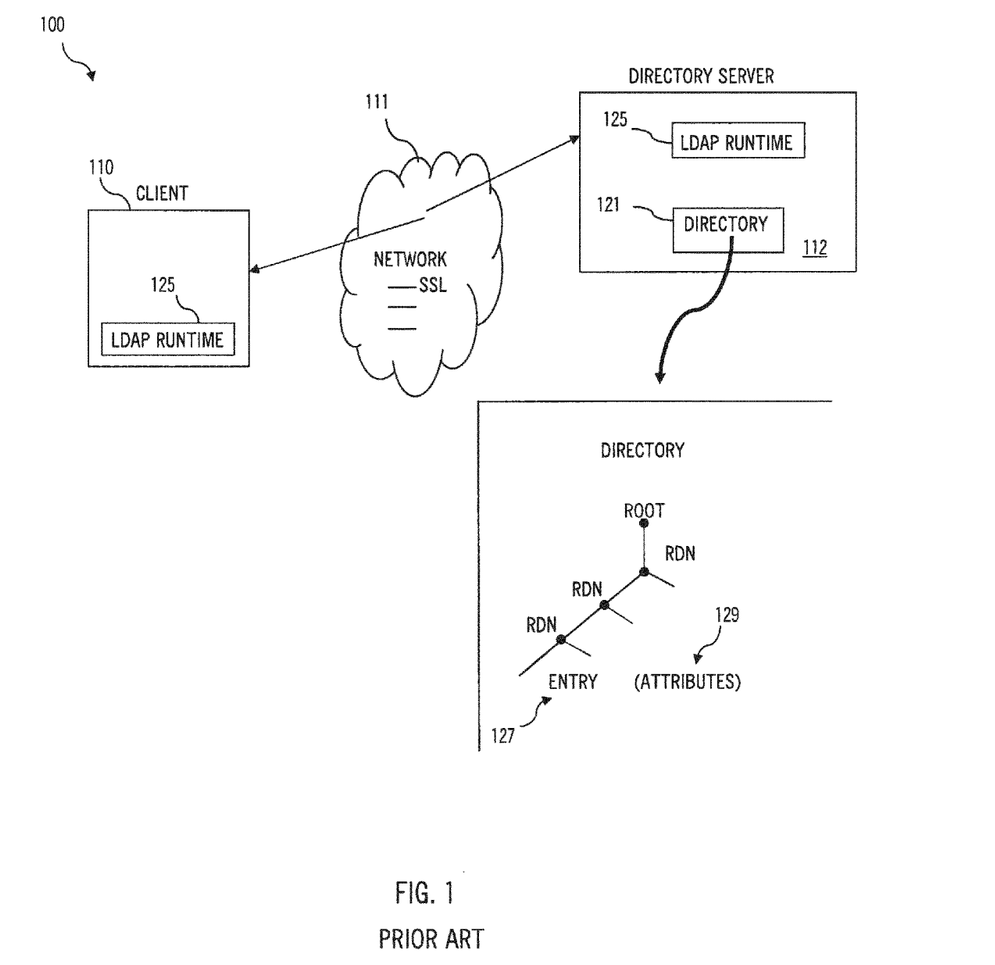
FIG. 1 illustrates a functional block diagram of a computer system or network implementing a conventional LDAP directory service with information stored in a hierarchical manner or tree structure difficult to access via database techniques.

FIG. 1 illustrates a block diagram of a conventional LDAP directory service system or network 100. According to the LDAP protocol, a client machine 110 makes a TCP/IP connection to an LDAP server 112 through network 111, sends requests, and receives responses. LDAP server 112 supports a directory 121 as illustrated in a simplified tree structure or form in FIG. 1. Each of the client and server machines further includes a directory runtime component 125 for implementing the directory service operations. The directory 121 is based on the concept of an entry 127, which contains information about some object (e.g., a person, a piece of inventory, and so on). Entries are composed of attributes 129, which have a type and one or more values. Each attribute 129 has a particular syntax that determines what kinds of values are allowed in the attribute (e.g., ASCII text, binary characters, and the like) and how these values are constrained during a particular directory operation. The directory tree 121 is organized in a predetermined manner with each entry uniquely named relative to its sibling entries by a relative distinguished name (RDN). An RDN comprises at least one distinguished attribute value from the entry 127, and one value from each attribute 129 is used in the RDN. According to the LDAP protocol, a globally unique name for an entry, referred to as a distinguished name (DN) includes a concatenation of the RDN sequence from a given entry to the tree root.

Further, in practice, the LDAP directory service model is based on object classes and represents data in a tree structure with each node being an entry complying width at least one object class. An object class is a collection of attributes that describes it, and each attribute has a name, type, and one or more values. For example, attributes describing a person might include a personas name (common name, or "cn", telephone number, and email address. An entry is an instantiation of one or more object classes. An entry is a collection of attributes that has a name, called a distinguished name (DN). The DN is used to refer to the entry unambiguously. An object class is a collection of attributes (or an attribute container) and may be defined within a schema. An object class may be a part of an object class hierarchy in which case it inherits all the properties of its parents.

Figure 2:
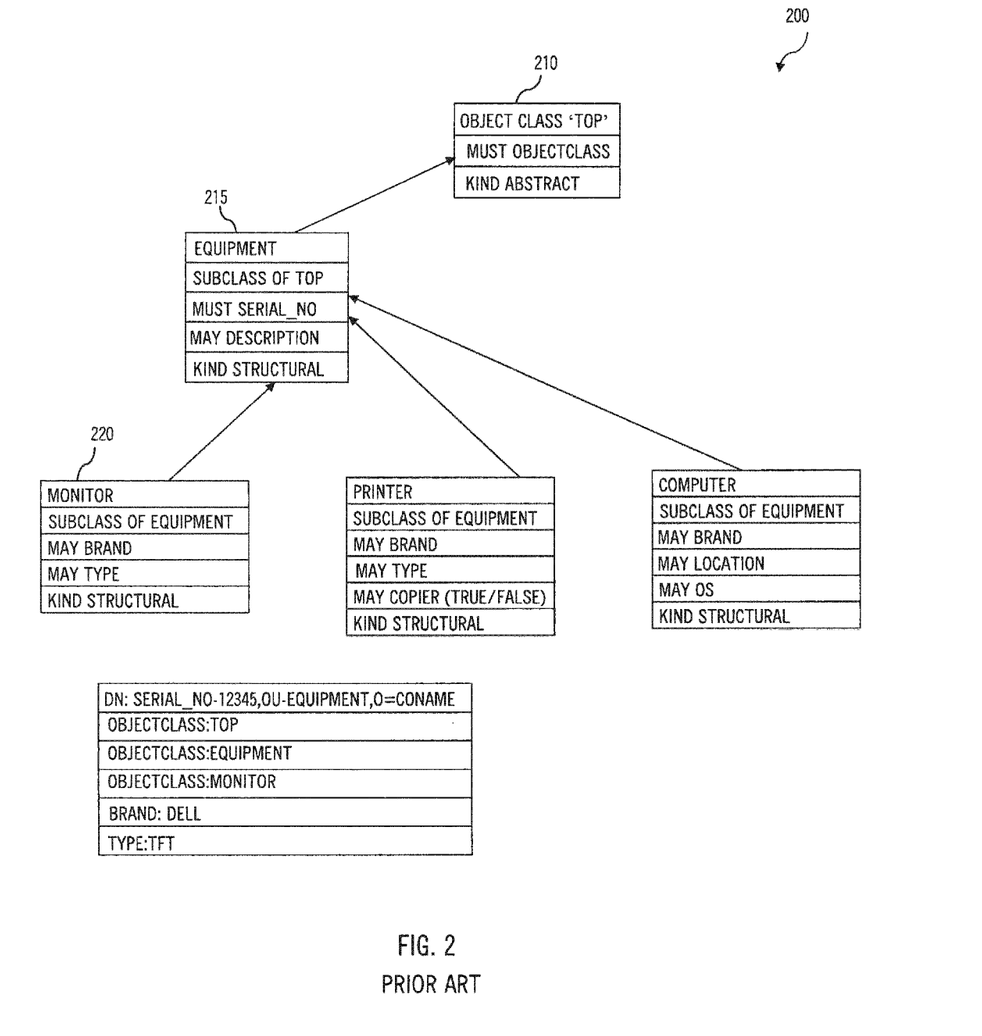
FIG. 2 illustrates a diagram presenting object classes used to represent equipment (or other inventory/assets) of a company in an LDAP directory.

FIG. 2 provides a diagram presenting object classes to represent equipment (or other inventory/assets) of a company. In this example 200, Monitor 220 is the child of Equipment 215, which is the child of Top 210 (e.g., the Abstract object class that terminates every object class hierarchy). An object class can be Structural, Auxiliary, or Abstract. Abstract classes are not instantiated by themselves but, instead, are only inherited by other classes. Structural classes derive from an inheritance chain that leads to object class Top 210. Structural classes do not inherit from Auxiliary classes, and Auxiliary classes do not inherit from Structural classes.

An object class has a globally unique name or identifier and is, as well as being an attribute container, also an attribute and may be searched on. An object class defines its member attributes and whether these must (i.e., mandatory) be present or may (i.e., optional) be present in an entry. One or more object class(es) must be present in an LDAP entry. Each object class supported by a LDAP server forms part of a collection called object classes, which can be discovered via the subsehema. An example of an object is where instances of an object class are an entry. Again, objects (or entries) in a LDAP directory or tree have a "reference", a DN (distinguished name such as DN: uid=joe, ou=group, dc=example, dc=com). The DN uniquely identifies or references a particular object with uid=joe, belonging to organizational unit='group' in a particular domain component "dc=example, dc=com." The diagram 200 shown in FIG. 2 presents the object classes to represent equipment at a company including monitors, printers, and computers. As shown an object class monitor 220 can have several attributes (e.g., brand, type, and the like) and inherits attributes from an object class equipment 215. The equipment object class 215 can have mandatory attributes (e.g., the serial_no attribute is shown to be a must) that will be inherited by monitor 220. In this example, the description attribute of the object class equipment 215 is not mandatory but will also be inherited by the object class monitor 220.

While LDAP directory services are growing in use, there are a number of limitations with storing the directory information data, updating and manipulating the direction data, and searching the data with a variety of methods (e.g., the LDAP protocol is optimized for particular read processes). A specific concern is that with the representation of the information or data in a LDAP directory tree structure the data cannot normally be accessed by means of database techniques such as via Structured Query Language (SQL). SQL is a standardized language for modifying and asking questions in a relational database that has been widely adopted. Hence, the information technology and data storage industry has been searching for ways to provide access to LDAP-represented data for a relational database.

Efforts have been made to represent a directory service naming hierarchy with relational tables, but these have not been widely adopted. For example, U.S. Pat. No. 6,085,188 to Bachmann et al. implements LDAP using a DB/2 backing store, and mapping is provided between a naming directory and parent and ancestor relation tables. Although this work attempts to provide faster and more efficient directory service search capabilities, implementation is very complicated and searches require very complex search queries. Designers of directory services continue to look for simpler solutions to facilitate searching and/or access to data stored in an information directory such as a LDAP directory tree structure. It may be useful for such solutions to utilize less storage to provide relational tables mapped to the tee structure while still adequately representing data of a LDAP or other tree in a relational database to facilitate searching with less complex search queries.

SUMMARY OF THE INVENTION

Briefly, partitioning methods and systems are provided for mapping information stored in an information directory to a relational database structure. For example, data entries of a LDAP directory tree structure may be mapped to a MySQL™ or other SQL relational database structure to facilitate accessing the LDAP-based information using LDAP, SQL, or even direct APIs. In an implementation of the method, an information directory is processed to map the attributes of each entry or tree node to a set of columns in a distinguished name (DN2ID) index table to define a DN for that entry. Further, an entry identifier or identification (ID) is assigned to each entry and stored in a record of the DN2ID index table with the associated DN, and the object classes defining the directory tree entry are also stored in the DN2ID index table. The mapping method further includes generating and storing relational tables for each of the object classes of the information directory, and data entries are stored in each of these object class relational tables that applies (e.g., a data entry from the directory may belong with more than one object class). Further, the relational table may be arranged with the entry IDs as the primary key and attributes for each entry defined by the particular object class may be stored this database structure.

One aspect of the mapping method (and an implementing data storage system) is that the primary key of the DN2ID index table is the DN, and the DN is formed of a number of attributes of the data entry (such as attributes A0 to An). By searching in the DN2ID index table for the DN, the entry ID can be readily determined. The object classes field specifies which object classes are associated with the matching or located directory entry. The attributes of the entry may then be read by following the entry ID to the relational tables, which are listed or identified in the object classes field of the DN2ID index table record.

More particularly, a computer-based method is provided for mapping information stored in an information directory such as a LDAP directory with a tree structure into a relational database structure. The method includes operating a processor (e.g., a processor in a data storage cluster, SQL server, or the like) to run or provide a directory mapping tool (e.g., software code causing the computer to perform particular functions). The mapping tool may act to access memory or disk that stores the information directory which has a number of data entries at nodes of its tree structure and each of these entries may include a number of attributes defined by one or more object classes. The method includes storing a DN2ID index table in memory, and this may involve using the mapping tool to generate a record for each of the data entries that includes a DN field filled or containing the attributes or attribute values. The method may further include operating the mapping tool to generate and store in memory a relational table associated with each of the object classes defined for the information directory, and the records of the relational tables each may be linked to one or more of the records/entries of the DN2ID index table.

The method may further include determining an entry identifier (i.e., an entry ID) for each of the entries of the directory and storing these entry IDs in the records of the DN2ID index table. The entry IDs may also be included in each record of the relational tables, and the relational tables may match or map attributes defined for the particular object class with each of these entry IDs. In some cases, the entry IDs are primer keys (PKs) for the relational tables, while the DNs may be PKs for the DN2ID index table. Accessing or searching of the mapped directory information may then include querying the DN fields of the DN2ID index table to identify a matching set of entry IDs, accessing one or more of the relational tables based on the object classes associated with the matching entry IDs, and reading or retrieving the attribute values (e.g., directory information or data associated with the directory entries), and displaying, printing, storing, or otherwise further processing or outputting the read information (e.g., delivering the information to an LDAP, SQL, direct API, or other client of a data storage cluster or system).

DETAILED DESCRIPTION OF THE PREFERRED EMBODIMENTS

Briefly, embodiments of the present invention are directed to methods and systems for mapping or representing data of an information directory such an LDAP tree structure in a relational table or database. The methods and systems facilitate using a relatively small amount of data storage to provide these relational tables storing directory data. Searching of the LDAP-represented data in the relational tables is also enhanced and searching techniques are also described in detail.

The following description provides specific examples or implementations using MySQL™ Cluster to provide the relational tables or databases into which the LDAP or other information directories are mapped, but it will be understood that the techniques described herein are useful in nearly any data storage system utilizing relational databases (such as other SQL server configurations). MySQL™ Cluster is useful in some applications as it offers scalability (e.g., scale by adding more data nodes and/or applications), high availability (e.g., there is no single point of failure), and high performance (e.g., soft real-time characteristics). Additionally, MySQL™ Cluster offers a number of ways to access the data stored in the LDAP directory and/or relational tables including NDB API (which provides direct access (e.g., C++, Java®, and the like) to data nodes (i.e., one of the fastest ways of accessing data) and SQL from a database server (such as a MySQL™ server).

Figure 3:
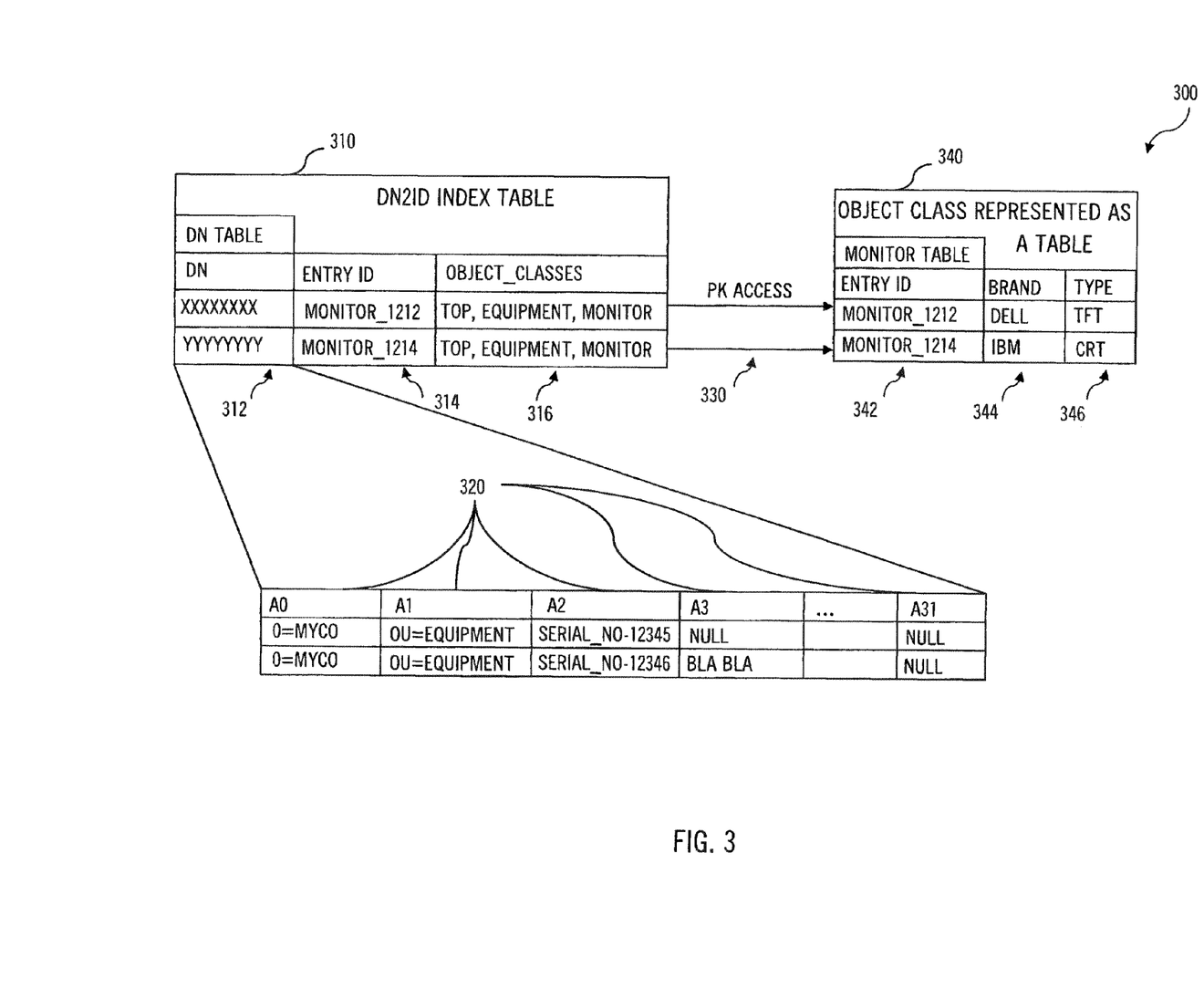
FIG. 3 illustrates a representative implementation or model providing mapping of an information directory (such as an LDAP tree or schema) to a relational database (such as MySQL™ Cluster or the like)

FIG. 3 illustrates a mapping model 300 for mapping LDAP schemas to a relational database, e.g., a MySQL™ Cluster database or the like. Generally, the model or mapping 300 (as may be stored in memory of a data storage system) is made up a distinguished name (DN) index table (or DN2ID index relational table) 310 and a set of object class tables 340 that represent each object class of an LDAP directory as a relational table. As shown, the DN2ID index table 310 includes each entry of the directory tree structure as a row or table record with columns or fields including the entry's DN 312, identifier (Entry ID) 314, and object classes 316. Each of the object class tables 340 represents an object class and includes rows or records for each object or entry in the LDAP directory associated with that object class with columns or fields including the object class attributes (here shown as Entry ID 342, Brand 344, and Type 346).

As shown by the fundamental design of the model 300, a DN2ID index table 310 is provided for each LDAP directory and stores all DNs 312, Entry IDs 314, and object classes 316 of the directory being mapped. In the model 300, the DN is represented in the table 310 as an accumulation of the number of attributes (A0-An) by the columns A0 to An or column set 320. Further, the DN 312 is chosen to be the primary key (PK) in the DN2ID index table 310 and is composed of the attributes A0-An. It should be noted that A0 (or the first of columns 320) is the top level of the LDAP tree, A1 is the next lower level, and so on. Thus, each part of the DN 312 is mapped to one of the attributes A0-An shown at 320 (in FIG. 3, n=31 but this not a limitation) in the DN2ID index table 310, which implies that each of the n attributes (A0-A31 for example) is represented as its own column in the DN2ID index table 310 as indicated at 312 exploded out at 320. In some implementations of model 300, each column A0-An shown at 320 is type-less and will only store string types (e.g., VARCHAR), but the type is embedded in the string (e.g., "o=myco").

Each record in the DN2ID index table 310 represents an entry of the LDAP directory. An entry may be made up of one or more object classes. In each record, the DN2ID index table 310 stores a field 316 containing the names of the object classes for each entry of the directory indicating which classes were used to construct the directory entry.

Object classes are represented as relational tables 340. A directory entry may be made up of one to many object classes, and, hence, each entry may be presented as a record in a like number of object class tables 340. Also, object classes can inherit from other object classes. As shown in FIG. 3, the DN2ID index table 310 links the DN 312 to the entries by a unique identifier shown as the Entry ID 314. The relational tables or object class tables 340 (which are a representation of each of the object classes) each use this Entry ID 342 as their unique identifier, which facilitates PK access to the relational tables 340 from the DN2ID index table 310 as shown at 330. In some cases, the Entry ID may also point to a hidden unique identifier, if appropriate or necessary. The DN2ID index table 310 is in some embodiments local to a portion of the distributed data storage such as local to the MySQL™ Cluster upon which it resides, and this means that each cluster will have its own DN2ID index table 310 (e.g., in cases using sub clusters and the like). In some embodiments, referrals may be provided between DN2ID index tables 310. Additionally, index columns in LDAP may be stored in the DN2ID index table 310.

As can be seen from the model 300, one aspect of the described method is that the primary key is the DN (with values of DN stored in column 312 (or columns 320)), and the DN includes a number of attributes (A0 to An stored in columns 320). By searching for the DN, the Entry ID can readily be determined (e.g., by searching for "DN: serial_no=12345, ou=equipment, o=myco" the Entry ID of "MONITOR_1212" can be determined). The object classes field 316 specifies which object classes are part of each entry including the entry found by searching for a particular DN. It is then possible to read the attributes of the entry of the LDAP directory by following the Entry ID to the relational tables 340 listed in the object classes field 316 as shown by PK access 330.

In some embodiments, the relational tables 340 may have the Entry ID field 342 as the primary key (PK) or as a UNIQUE index so that data can be fetched efficiently. The usefulness of making the Entry ID the PK of table 340 may be seen with reference to FIG. 3 and the following example. The DN 312 of "DN: serial_no=12345, ou=equipment, o=myco" is represented as one row in the DN2ID index table 310 and is mapped as follows: "o=myco" is stored in column A0; "ou=equipment" is stored in column A1; and "serial_no=12345" is stored in column A2.

Figure 5:
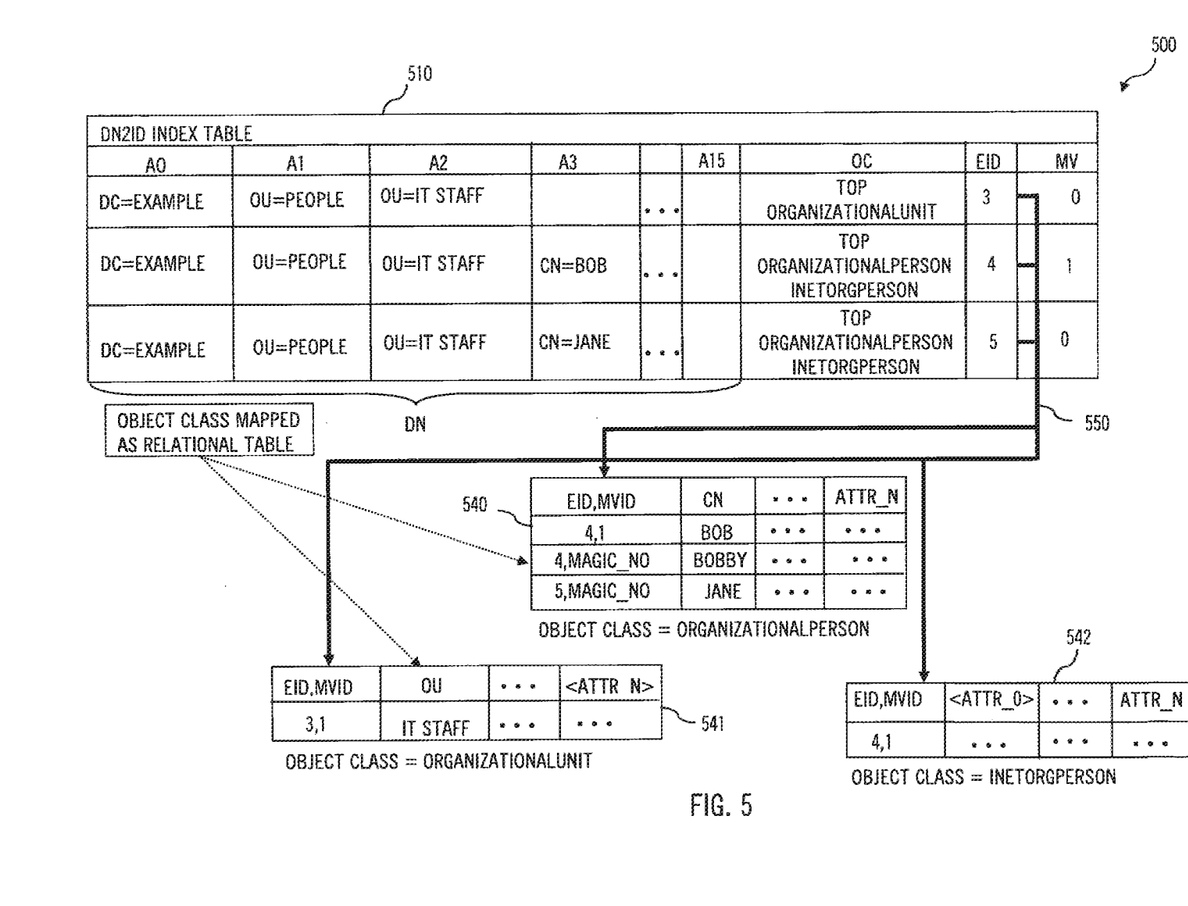
FIG. 5 illustrates another implementation or model providing mapping of an information directory to a relational database similar to the example shown in FIG. 4.

FIG. 5 illustrates another mapping model 500 useful for implementing the methods and systems described herein for mapping LDAP or other schema to a relational database. The mapping 500 includes a DN2ID index table 510 and a set of relational tables 540, 541, 542 that represent object classes mapped as relational tables, which may facilitates PK access 540 to the tables. The DN2ID index table is arranged similar to table 310 but further includes a stored bitmask (call a "MV" or multivalued) shown at the last column of the DN2ID index table 510. As shown in FIG. 5, column A0 is the root of the tree (dc=example). A1 is the next level in the tree (DN: ou=people, dc=example). The root node (AO) has dc=example, and columns A1 to An in this example will contain terminator values (e.g., NULL or <empty string>). The object classes column or field of this record stores the object classes that make up this directory entry, i.e., top, equipment, and monitor. Thus, by having columns of A0 to An, it is possible to represent an LDAP tree with a height of n levels. This means that the DN typically will be represented as a string, irrespective of the LDAP type it was.

A bitmask (i.e., MV in table 510) stored in the DN2ID index table 510 indicates whether or not a particular object class for an entry is multivalued or not. If the OC is multivalued (e.g., at least one attribute in any object class actually stores multiple values), then a range scan on the object classes is used. If the entry is not multivalued, then primary key lookups are used. The primary key lookup or any primary key operation can then be made on <EID, magic_no>, where magic_no is known by the LDAP server and is a very big number. Hence, it knows what to search for in case the object class does not contain any multivalued attributes. If an attribute in an object class is not multivalued but is upgraded to become multivalued because a new record (attribute) is inserted in the object class table for a given EID, the appropriate bit in the MV bitmask in the DN2ID index table 510 is set to one. In some implementations, each MV attribute for one entry is represented as one record in the Object Class table, where all other attributes for that record are NULL to avoid repetition of data and to save space, except the record identified by <eid, magic_no>, which can carry more than one or more values. For example, a relational database may have the record. <4, magic_no, bob, <some data 1>, . . . , <some data N>, and then want to add another CN for bob, i.e., the entry becomes M: <4, 1, bobby, <NULL>, . . . , <NULL>>."

Referring again to FIG. 3 (and with the following discussion generally applying to table 510 as well), object classes may each be represented by a relation table 340 (which shows for example the monitor object class). LDAP data types of the attributes may be mapped to the MySQL™ data types (or other SQL or other implementation) in the table 340 representing the object class. As mention earlier, the relational tables portion of the LDAP schema has an Entry ID 342 as the primary key (PK) or as a UNIQUE index for efficient retrieval. In the embodiment or mapping 500 of FIG. 5, which may be useful in many settings or applications, the primary key/unique index is the combination of <EID (Entry ID) MVID> whereas in table 340 only <EID> is the primary key and unique.

(Multi) Inheritance may be supported when mapping from the LDAP directory tree structure to the relational database as inheritance is a part of the LDAP. This may be addressed by providing the object classes field or column 316 to the DN2ID index table 310 specifying the classes in the inheritance structure. The object classes field 316 in the DN2ID index table 310 lists the object classes that are part of the inheritance, and the Entry ID 314 is used to read from the tables part of the inheritance. The content of the object classes field 316 corresponds to values found in the object class structure, which can be defined in an LDIF file (LDAP Date Interchange Format file) such as: objectclass: top; objectclass person; objectclass: organizationalPerson. In this example, the organizationalPerson class inherits from the person object class, and, in turn, the person object class inherits from the top object class.

An abstract object class may be represented as a relational table. The LDAP schema defines whether an object class inherits from an abstract class. The attributes of an abstract object class can also be part of the relational table that represents the object class that inherits from the abstract object class. Auxiliary object classes can also be represented as separate relational tables and should be listed in the object class field 316 in the DN2ID index table 310.

In LDAP, a variety of searches may be performed including BASE, SUB, and ONELEVEL searches, and the mapping of information stored in a LDAP tree structure into a relational database structure as taught herein (such as with model 300 of FIG. 3) supports most if not all of the LDAP searches. For example, in a BASE search, the DN described herein uniquely specifies an object, and the BASE search results in only one entry being retrieved. With reference again to FIG. 3, a BASE search may be performed with the DN: serial_no=12345, ou=equipment, and o=myco. In practice, an LDAP server (e.g., an openLDAP server or the like) would issue a primary key (PK) operation in the DN2ID index table of the database store or cluster to fetch the Entry ID 314 and object classes 316 matching the submitted DN. The openLDAP server then stores an internal mapping between the object classes and the relational table(s) 340. Depending on which attributes are queried for, the openLDAP server sets up PK operations 330 to fetch the necessary attributes 344, 346 from the appropriate relational tables 340. The number of PK operations 330 is not more than the number of object classes 316 that constitute the LDAP directory entry. The PK operations 330 may be executed in a batch on the relational tables 340, and the LDAP data/information is retrieved to the openLDAP server. Again, the embodiment or mapping 500 of FIG. 5 may be useful in many settings or applications and used in place of the mapping 300, and, in the mapping 500, the primary key/unique index is the combination of <EID (Entry ID), MVID>whereas in table 340 only <EID>is the primary key and unique.

Figure 6:
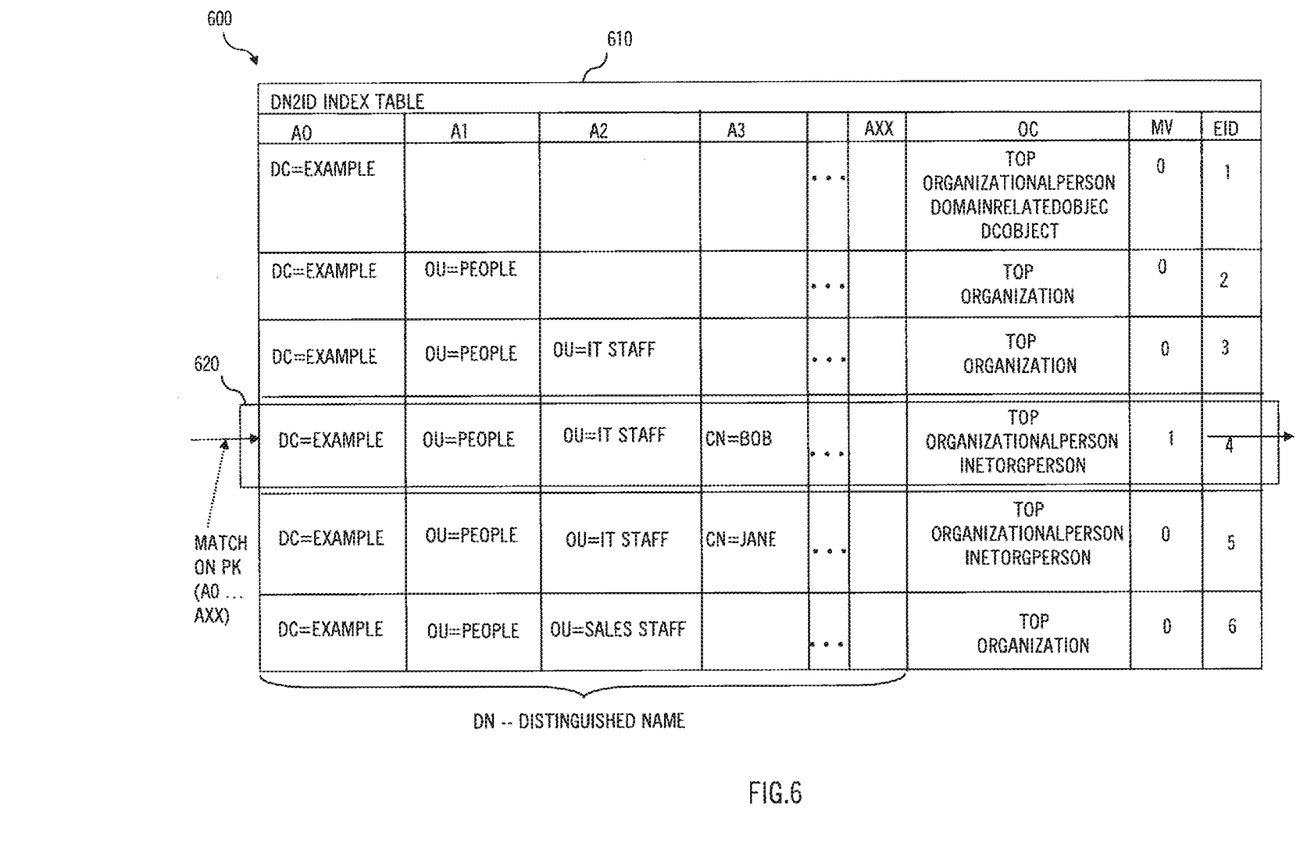
FIGS. 6 and 7 illustrate BASE and SUB searches, respectively, of a DN2ID index table.

FIG. 6 illustrates a BASE search 600 being performed on DN2ID index table 610 with box 620 showing a DN specified by the search 600. Generally, a BASE search 600 looks for a match on PK (e.g., A0 . . . Axx), and a search result will provide corresponding one or more relational tables (or object classes). For example, MySQL™ Cluster allows batch retrieval of data, and, thus, all entries of data can be retrieved in one roundtrip or link to the relational tables irrespective of the number of OCs representing an entity. In practice with table 610, entries with MV=0 will be read using PK operations since they contain no multivalued attributes. If MV=1, though, the entry has one OC that is multivalued and may be read with a range scan.

Figure 7:
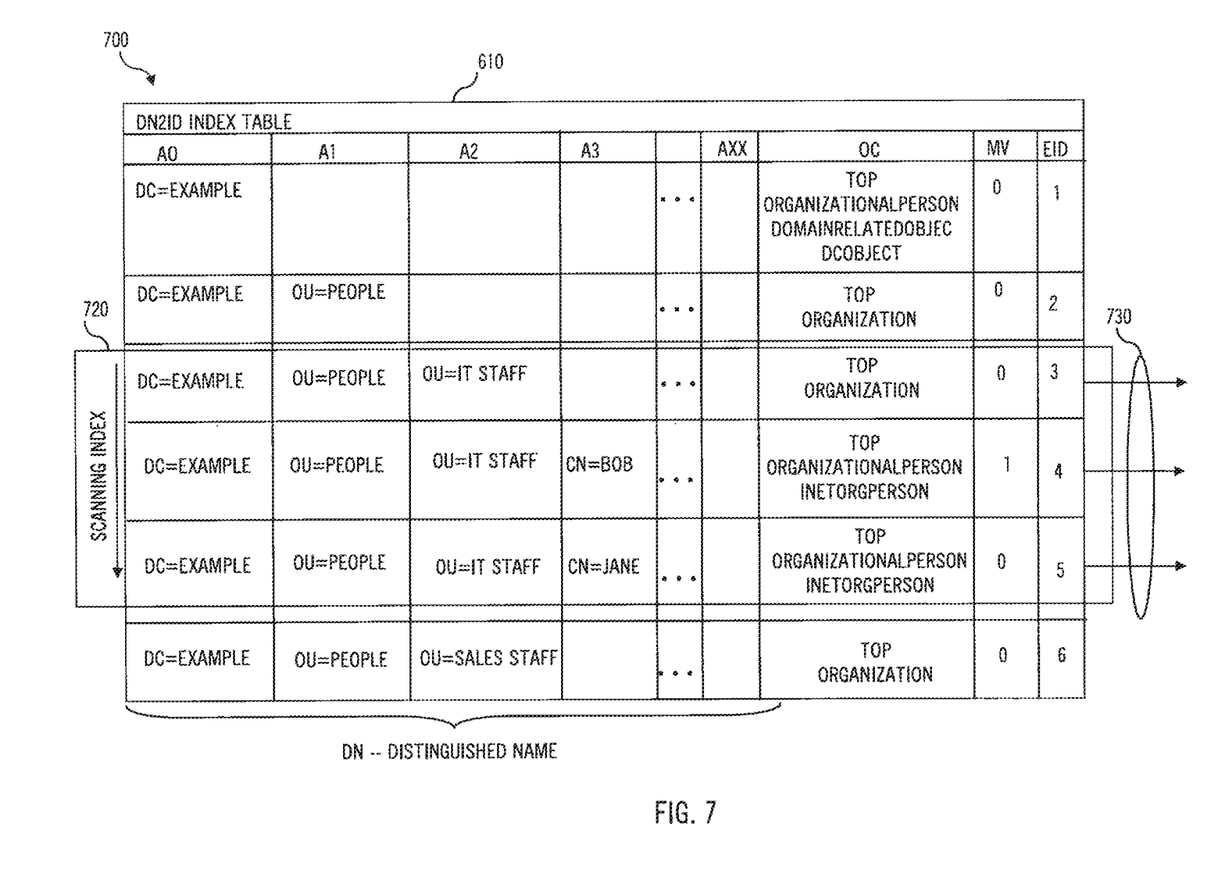

The SUB search, the entry associated with the DN and all of its children are scanned, e.g., an entire subtree of the LDAP directory is retrieved. For example, a SUB search may be performed with DN: ou=equipment and o=myco in the model 300 of FIG. 3. An index scan operation oil "equipment, myco" is completed in the DN2ID index table 310. The result may be one to many records, and the Entry ID 314 may be followed using PK operations 330 in the same fashion as for the BASE search. This may be implemented (e.g., with a search tool or mechanism running on the LDAP, the SQL, server, or other portion of the data storage system) as a batched, nested loop join. FIG. 7 illustrates a SUB search 700 on the DN2ID index table 610 with the scanning index box 720. The links 730 may be followed to (or represent following to) corresponding relational tables (object classes) associated with the SUB search results 720. MySQL™ Cluster allows batch retrieval of data so, as with the BASE search discussed above, all entries of data can be retrieved in one roundtrip irrespective of the number of OCs representing an entity. Again, PK operations may be used to read entries where MV=0 and a range scan may be used for entries with MV=1.

In the ONELEVEL search, the search (again, implemented by a search tool or mechanism running on the LDAP, SQL, or other server of the storage system) is to one level "below" the DN 312, e.g., one level "below" can be retrieved. Searches are performed at the level specified by the DN parameter, and the entries one level below in the hierarchy or LDAP directory tree structure are retrieved. For example, an ONELEVEL search may be run with DN: serial_no=12345, ou=equipment, and o=myco in the model 300. This may be performed with an Index Scan operation with a search of the DN2ID index table 310 with column A0: o=myco; column A1: ou=equipment; and column A2: serial_no=12345. The searching mechanism or tool looks for a match where the column "after" (in this case, column A3) is, for example, NULL or a user-defined terminator. The results may be zero to many records, and, again, the Entry ID 314 may be followed using PK operations 330 in the same fashion as for the BASE search. Also, the search may be implemented as a batched, nested loop join.

Of course, other searches may be performed once the mapping to relational tables has been performed for an information directory. For example, searching may be performed with some filter criteria in the DN (e.g. the DN column or field 312 of the DN2ID index table 310 of FIG. 3). A search may take a form similar to DN: ou=equipment, o=myco with filter (serial_no=1234*) or the like. Internal SCAN filters in MySQL™ Cluster may then be used, and the result may be zero to many records. Again, these records or search results in the index table 310 may be used to follow the Entry ID 314 into the relational tables 340 using the PK operations 330 in the same fashion as for the BASE search. Again, the search may be implemented as a batched, nested loop join.

Implementation of data storage systems with mapping of an information directory (e.g., a LDAP tree structure) into a relational database structure in accordance with embodiments of the invention provides a number of useful advantages and features desired by the information technology industry. The model (e.g., the model 300 of FIG. 3 or similar implementations) allows for querying the relational tables (e.g., the object classes of the LDAP) using both database techniques and processes as well as via the information directory's protocol and tools (e.g., using NDB API and SQL as well as through LDAP). A BASE search can in MySQL™ Cluster be performed in two primary lookups (e.g., the DN2ID index table 310 and the relational tables 340 making up a LDAP directory entry).

The model allows for flexibility. For example, schemas can easily be extended. Subtrees may be moved, added, and/or renamed after mapping to the model is implemented. By using the Entry ID as the PK or as the UNIQUE index of the object class relational tables, these tables 340 can be queried from the LDAP server. Another primary key (e.g., an existing primary key such as IMSI on MSISDN in the HLR telecommunications world) may be utilized in some cases in the relational tables 340 and/or hidden unique identifiers may be used that may be transparent to end users.

The model 300 also offers high performance. For example, BASE level searches in, for example, MySQL™ Cluster may be handled in two network hops between the LDAP server and the Cluster. One involves fetching the DN 312 in the DN2ID index table 310 while the other involves fetching the data in the underlying relational table(s) 340 associated with the entry of the director. Other searches can be performed by batched, nested loop joins, and special index tables can be used to improve performance from an application standpoint. Separate index tables may also be used to index attributes. As will be appreciated, searches are very efficient with the mapping of LDAP directory information as shown in model 300 of FIG. 3. By searching the DN2ID index table 310 for a given DN in column/field 312 (either a BASE, ONELEVEL, SUBTREE, or other search), it is possible to locate a number of entries of a directory together with the associated object classes and the Entry IDs. Once the Entry ID(s) 314 and object class(es) 316 are located in the DN2ID index table 310, a number of batch read operations to all object classes (e.g., in the relational tables 340) from which the entry (or entries) were constructed can readily be performed.

Figure 4:
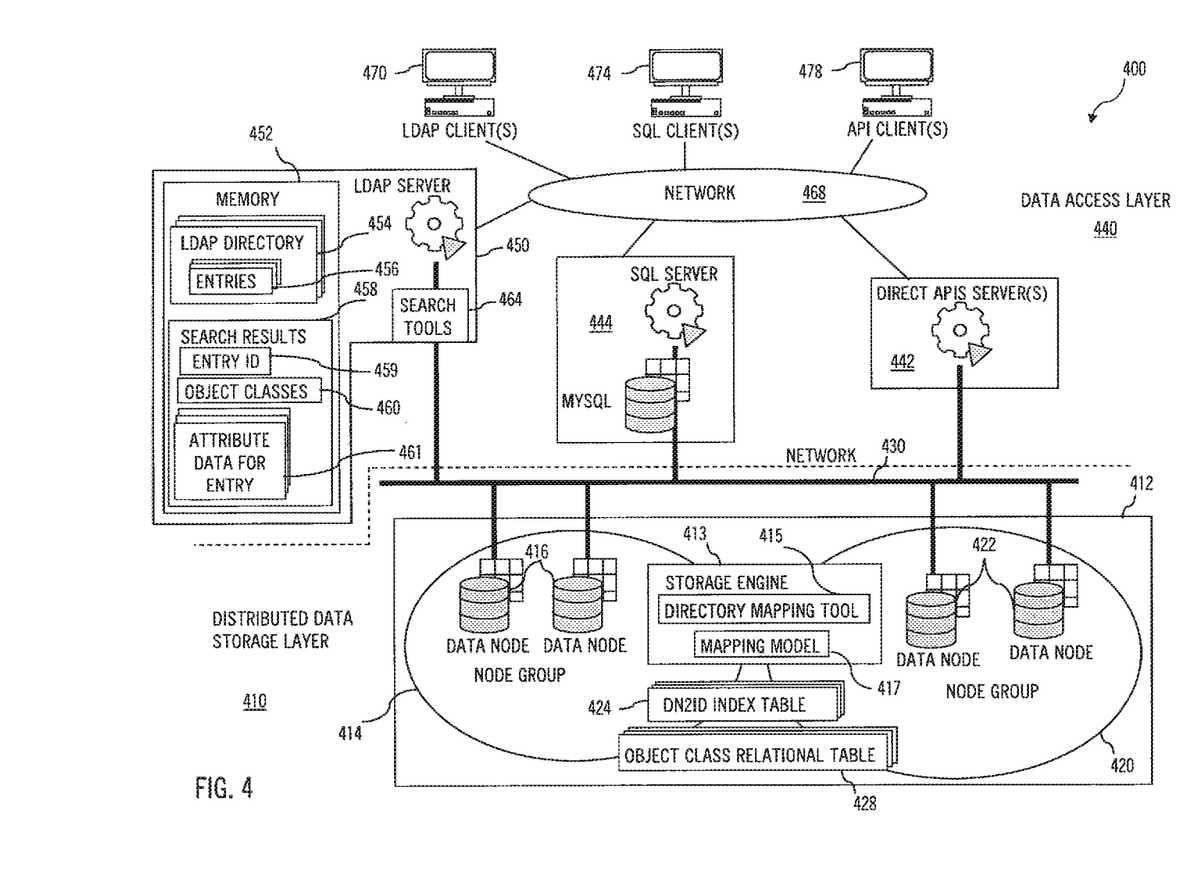
FIG. 4 illustrates a storage system or network that may implement the mapping of an information directory into relational tables and facilitate searching of the directory entries or directory information/data.

With the above discussion in mind, it may be useful to describe one exemplary data storage system or network 400 with reference to FIG. 4 that implements the functionality described herein with hardware and software devices. As shown, the system 400 includes a distributed data storage layer 410 and a data access layer 440 that are interconnected via digital communications network 430. The distributed data storage layer 410 may take many forms to practice the invention but typically is adapted for storing large quantities of data in relational databases and in a disturbed manner. In some cases, this goal is achieved by using a data cluster 412 with two or more node groups 414, 420, and each group 414, 420 may include two or more data nodes 416, 422.

In some embodiments, the storage layer 410 may comprise a MySQL™ Cluster or the like with a storage engine 412 managing the cluster(s) (such as the NDB Storage Engine or the like). The mapping of information directories into relational tables of the cluster 412 may be achieved by providing a directory mapping tool 415 that implements a mapping model 417, and the tool 415 may be run by a single or multiple processors on one or more distributed computing or server devices and the mapping model 417 may be stored in local or other memory accessible to the mapping tool 415. The directory mapping tool 415 may be called in the system 400 to process an LDAP or other information directory to create an DN index table 424 (with one table 424 typically provided for each cluster 412 and, in some cases, for each node group 414, 420) and also to generate object class relation tables 428 for each object class included within the processed/mapped directory. The DN2ID index table 424 and object class relational tables 428 typically are stored in a distributed manner in the storage layer 410 but may be provided on a single data node 416, 422 or, in part, on a server of the data access layer 440 (such as storing the index table 424 on an SQL server 444 or the like). The DN2ID index table 424 and relational tables 428 are formed based on the mapping model 417, e.g., to provide the mapping of an LDAP directory 454 to relational tables 428 as shown in the model 300 of FIG. 3.

A data access layer 440 is provided in the system 400 that provides access to the data in storage layer 410 via network 468 (i.e., the Internet, an intranet, or the like with wired and/or wireless links) to a plurality of LDAP, SQL, API, and other clients 470, 474, 478. The interfaces to the storage layer 410 (or cluster 412) may take a number of forms such as: an LDAP server 450 to allow searching and modifying data using LDAP; a SQL server (e.g., a MySQL™ or similar server) 444 to read and modify data using SQL; direct APIs 442 (e.g., C++, Java®, and so on) to manipulate data in soft real-time; and other interfaces (such as mod_ndb in MySQL™ embodiments) that provide Web Services APIs to query and modify data over HTTP using GET, POST, and DELETE requests and so on.

As shown in FIG. 43 the LDAP server 450 includes memory 452 storing one or more LDAP directories 454 with numerous entries or data objects 456 arranged in hierarchical order or in tree structures. Alternatively, the directories 454 may be stored in the storage layer 410 accessed by LDAP server 450 via network 430. The LDAP server 450 also includes a search tool or mechanism 464 that functions to perform searching of the DN2ID index table(s) 424 as well as using PK operations to retrieve data entry data from the object class relational tables 428 as discussed above with reference to FIG. 3. For example, the search tool 464 may function to query the DN2ID index table 424 for a directory 454 and store search results 458 in the memory 452 (or in other memory of layer 410), and these results 458 may include Entry IDs 459, object classes 460, and attribute data 461 for entries 456 (such as using a BASE, ONELEVEL, SUBTREE, or other search). In some embodiments, the directory mapping tool 415 and search tool 464 are combined into single software tool. For example, the system 400 may be implemented with the data storage layer 410 and data access layer 440 adapted to MySQL™ Cluster with its LDAP support being based on OpenLDAP. The combination of the tools 415, 464 may provide a backend written for OpenLDAP, in this case, that terminates the LDAP protocol and uses, for example, NDBAPI or the like to access data in the MySQL™ Cluster 412. In this type of embodiment, the LDAP server 450 may not be required to cache anything.

In the system 400 of FIG. 4, the clients 470, 474, 478 may take a variety of hardware forms such as personal, laptop, notebook, and other computers or computing devices, cellular phones, personal data assistants, servers, and so on, and the clients and components of data access layer may utilize a wide variety of interfacing software applications including, but not limited to, JDBC®, ODBC, NDB API, LDAP, web-services, and the like. For example, the clients may transmit database queries or other data requests over the network(s) 468 to the data access layer 440 components/servers 442, 444, 450. The servers or nodes 442, 444, 450 may also be implemented in or using a variety of computers or computing devices such as servers using one or more of NDB API, MySQL™ Server, OpenDS®, openldap, SailFin, GlassFish, FreeRADIUS, and other for interfacing with the clients 470, 474, 478 and/or with the data store or storage layer 410, and the nodes 442, 444, 450 may run applications such as web services, search engines, directory mapping tools, and so on. Some of the embodiments give examples involving MySQL™ products and tools such as MySQL™ Cluster supporting LDAP directories, but it will be understood that the principles of the invention may be practiced with other types of directory services (e.g., X.500) and/or using other relational database management systems (e.g., Oracle, Sybase, Informix, and other company systems and products) to create, manage, and/or access the generated index tables and relational tables including directory entry data or information.

The data nodes 416, 422 generally will comprise servers/hosts and data storage devices such as disks, disk arrays, tape-based storage devices, optical data storage devices, and the like. The storage engine 412 may run on one or more of the data nodes 416, 422 or may run on another device that may be adapted with one or more processors managing operation of input/output devices and memory and running software modules or programs that may be provided via computer-readable medium adapted to cause a computer or the system 400 or data store 410 (or data access layer 440 devices) to perform the functions described herein. In this discussion, computer and network devices and data store devices are described in relation to their function rather than as being limited to particular electronic devices and computer architectures. To practice the invention, the computer devices and network devices may be any devices useful for providing the described functions, including well-known data processing and communication devices and systems such as desktop computers, and even personal digital assistants, personal, laptop, and notebook computers with processing, memory, and input/output components, and server devices configured to maintain and then transmit digital data over a communications network. Data, including device qualification data, device simulation, data, event messages/files simulating device operations in response to device qualification data, and transmissions to, from, and within systems is typically communicated in digital format following standard communication and transfer protocols, such as TCP/IP, HTTP, HTTPS and the like, but this is not intended as a limitation of the invention. In one test setup, four data nodes with 4M subscribers were provided, and the data storage layer 410 had the following characteristics: dual CPU dual core (3.0 GHz); 12 GB RAM; 146 GB SAS 10 KRPM; Gig-E; MySQL™ Cluster 5.1 CGE 6.3.10; and RH AS 5.1. The application or data access layer 440 had the following characteristics: dual CPU quad core (2.33 GHz); 8 GB RAM; 146 GB SAS 10 KRPM; Gig-E; and RH AS 5.1.

In use of the system 400, each LDAP directory 454 is mapped by the mapping tool 415 to a relational DN2ID index table 424. Object classes of the directory 454 are represented as separate relational tables 428. An entry 456 is an instance of one or many object classes, and a DN (or Distinguished Name) refers to a node in the directory tree 454. Each DN2ID index table 424 for each directory tree 454 contains a DN mapped to columns A0 to An, object classes making up the entry, and an Entry ID that identifies an entry in the object classes making up the entry. Object classes are represented as one relational table per object class or an attribute set containing many object classes (but an Entry ID is provided as the PK in any case). The Entry ID links the DN2ID index table 424 with the object classes. Indexes on attributes can be created in the DN2ID index table 424, in attribute sets, or in object classes. During mapping by tool 415, each level of the directory tree 454 is mapped to a column (A1 to An) of the DN field/column sets. For example, a directory tree 454 of 32 levels (or height) would need DN columns A0; to A31 to define the DN for all the nodes or entries 456 of the tree 454.

After the mapping to form index table 424 and relational tables 428 for a directory 454, all accesses or searches (e.g., searches performed by tool 464 or other devices to perform SUB, BASE, ONE-LEVEL, or other searches) follow a similar recipe. Particularly, the access involves locating the DN in the DN2ID index table 424 to figure out which object classes the entry is made up of and which Entry ID the DN2ID index table 424 links to in the corresponding object classes. For example, an index search may involve scarring the ordered index and reading up attributes that are part of the entry, and then, reading the DN from the DN2ID index table 424 to build up a full entry. An exact match access may involve using the DN to find an Entry ED in the DN2ID index table 424 and then batch reading using the Entry ID from the object class relational tables 428.

Other features of the system 400 and its operation may include providing expected or normal LDAP features such as sub string searches, alias, referrals, and so on. Additionally, multivalued (MV) attributes may be supported. For example, a bitmap stored in the DN2ID index table 424 indicates if an object class of an entry is MV or SV (single valued). For access, MY mean that attributes in object classes or tables 428 are scanned using Index Scan on Entry ID while SV means that attributes in object classes or tables 428 are read using PK (e.g., using a known magic_no for the MVID). Another feature of system 400 is that data (such as LDAP attributes) can be read using SQL via server 444 to access index table 424 and/or relational tables 428.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. The above described methods and systems facilitate mapping a hierarchical model (such as an LDAP directory) to a relational database. This provides scalable access paths in a clustered environment, with typically two or less database accesses for any SUBTREE, ONELEVEL, BASE, or index search to the relational database backend to retrieve a set of entries. The described methods and systems also teach a distinction between SV attributes and MV attributes in the DN2ID table, and then making appropriate interactions with the relational database.

We claim:

1. A computer-based method for mapping information, which is stored in an information directory having a tree structure, into a relational database, comprising:
   operating a processor to provide a directory mapping tool;
   with the directory mapping tool, accessing memory storing the information directory, the directory having a plurality of data entries at nodes of the tree structure and each of the data entries comprising a plurality of attributes;
   storing a distinguished name (DN2ID) index table in memory including operating the directory mapping tool to generate a record in the DN2ID index table for each of the data entries, wherein a distinguished name (DN) field of each of the data entry records of the DN2ID index table contains the attributes associated with one of the data entries, and wherein the storing of the DN2ID index table further comprises determining an entry identifier (ID) for each of the data entries and storing the entry ID in a field of an corresponding one of the data entry records of the DN2ID index table:
   operating the directory mapping tool to generate and store in memory a relational table associated with each object class defined for the information directory, wherein each record of each of the relational tables is linked to one or more of the data entry records in the DN2ID index table, wherein each of the records of the relational tables includes a field containing one of the entry IDs and includes a set of attribute fields defined by the corresponding object class and containing attribute values for the entry linked to the entry ID, and wherein the entry IDs are primary keys for the relational tables; and
   accessing the attribute values by querying the DN fields of the data entry records in the DN2ID index table to identify a matching set of entry IDs, accessing one or more of the relational tables with at least a portion of the matching set of entry IDs, and retrieving the attribute values associated with the portion of the matching set of entry IDs.

2. The method of claim 1, further comprising accessing the relational tables with Structured Query Language (SQL)-based queries.

3. A computer-based method for mapping information, which is stored in an information directory having a tree structure, into a relational database, comprising:
   operating a processor to provide a directory mapping tool;
   with the directory mapping tool, accessing memory storing the information directory, the directory having a plurality of data entries at nodes of the tree structure and each of the data entries comprising a plurality of attributes;
   storing a distinguished name (DN2ID) index table in memory including operating the directory mapping tool to generate a record in the DN2ID index table for each of the data entries, wherein a distinguished name (DN) field of each of the data entry records of the DN2ID index table contains the attributes associated with one of the data entries, wherein the storing of the DN2ID index table further comprises determining an entry identifier (ID) for each of the data entries and storing the entry ID in a field of an corresponding one of the data entry records of the DN2ID index table, wherein the storing of the DN2ID index table further comprises determining a set of object classes associated with each of the data entries and storing the set of object classes in a field of each of the data entry records of the DN2ID index table; and
   operating the directory mapping tool to generate and store in memory a relational table associated with each object class defined for the information directory, wherein each record of each of the relational tables is linked to one or more of the data entry records in the DN2ID index table, and wherein the relational tables are selectively accessed using the set of object classes.

4. A data storage system with data entries of an information directory that are mapped to a database structure, comprising:
   a directory service server providing access to the information directory that is stored in memory and that has entries arranged in a hierarchical tree structure, the hierarchical tree structure including a plurality of object classes defining attributes for the entries; and
   a relational database system storing a distinguished name (DN2ID) index table and a set of relational tables, wherein each of the relational tables represents one of the object classes and includes a first record for each of the entries associated with the represented object class, wherein the DN2ID index table stores a second record for each of the entries of the hierarchical tree structure with each of the second records having a DN field and an object classes field, and wherein the distinguished name (DN) field comprises an accumulation of attributes of a corresponding one of the entries and the object classes field comprises a plurality of the object classes associated with the corresponding one of the entries.

5. The system of claim 4, wherein the directory service server comprises a Lightweight Directory Access Protocol (LDAP) server and wherein the LDAP server accesses the relational database system to retrieve data associated with the entries via LDAP-based searches.

6. The system of claim 4, wherein the DN2ID index table and each of the relational tables further comprise an entry identifier (ID) for each of the entries of the hierarchical tree structure and further wherein the entry IDs each link one of the second records in the DN2ID index table to at least one of the first records in the relational tables.

7. The system of claim 6, wherein the relational database system comprises a Structure Query Language (SQL)-based storage system, wherein the DN2ID index table and the relational tables are accessible with SQL commands, and wherein the entry IDs are used as primary keys for the relational tables.

8. The system of claim 4, wherein each of the relational tables further comprises a plurality of fields associated with the attributes for the entries associated with one of the object classes corresponding to the relational table.

9. A computer program product including non-transitory computer useable medium with computer readable code embodied on the computer useable medium, the computer readable code comprising:
   computer readable program code devices configured to cause a computer to access a Lightweight Directory Access Protocol (LDAP) directory in memory;
   computer readable program code devices configured to cause the computer to store an index table in memory, the index table having a record for each entry of the LDAP directory, wherein each of the records of the index table has a field storing a distinguished name value comprising attributes of the entry and further has a field storing a unique entry identifier (ID) for the entry wherein the computer readable program code devices configured to cause the computer to store an index table in memory are configured to determine a set of object classes associated with each of the entries and storing the set of object classes in a field of each of the records of the index table, and wherein the index table further comprises a field in each of the records of the index table that stores the set of object classes associated with the entry corresponding to the entry ID; and computer readable program code devices configured to cause the computer to store in memory a relational table for each object class defining the LDAP directory, wherein each of the relational tables comprises records for the entries associated with the corresponding object class and each of the records of the relational tables comprises a field storing the entry ID and a field storing the attributes of the entry associated with the corresponding one of the object classes, and wherein the relational tables are selectively accessed using the set of object classes.

10. The computer program product of claim 9, further comprising computer readable program code devices configured to cause a computer to access the index table with a distinguished name query, to determine one of the entry IDs based on the distinguished name query, and to access the relational tables that match the list of object classes associated with the entry ID using the entry ID.

11. The computer program product of claim 10, wherein the distinguished name query comprises at least one of a LDAP-based search and a Structured Query Language (SQL)-based search.

12. The computer program product of claim 10, wherein the accessing of the index table comprises reading the attributes associated with the entry from two or more of the relational tables.

13. The computer program product of claim 9, wherein the distinguished name value comprises the attributes mapped to a like number of fields in each of the records of the relational tables.

14. The computer program product of claim 9, further comprising computer readable program code devices configured to cause a computer to perform at least one of a LDAP BASE search, a LDAP SUB search, and a LDAP ONE-LEVEL search upon the index table and then upon the relational tables using at least one of the entry IDs.

15. The computer program product of claim 9, wherein the attributes are defined by the object classes and further wherein the attributes for each of the entries comprises one or more attributes associated with the object classes that are used to construct the LDAP directory.

16. The method of claim 3, wherein each of the records of the relational tables includes a field containing one of the entry IDs and includes a set of attribute fields defined by the corresponding object class and containing attribute values for the entry linked to the entry ID.

17. The method of claim 16, wherein the entry IDs are primary keys for the relational tables.

18. The method of claim 3, further comprising:
accessing the attributes by querying the DN fields of the data entry records in the DN2ID index table to identify a matching set of entry IDs, accessing one or more of the relational tables with at least a portion of the matching set of entry IDs, and retrieving the attributes associated with the portion of the matching set of entry IDs.

19. The method of claim 18, further comprising accessing the relational tables with Structure Query Language (SQL)-based queries.

20. The method of claim 1, wherein an object classes field of each of the data entry records of the DN2ID index table comprises a plurality of the object classes associated with a corresponding one of the data entries of the tree structure.

21. The method of claim 1, wherein the DN field comprises an accumulation of attributes of a corresponding one of the data entries of the tree structure.

22. The method of claim 1, wherein the querying the DN fields of the data entry records in the DN2ID index table to identify a matching set of entry IDs includes using Structured Query Language (SQL) commands.

23. A non-transitory computer-readable storage medium storing one or more non-transitory computer program products that are configured to:
provide a directory mapping tool;
access, with the directory mapping tool, an information directory in memory, the directory having a plurality of data entries at nodes of a tree structure and each of the data entries comprising a plurality of attributes;
store a distinguished name (DN2ID) index table in memory and operate the directory mapping tool to generate a record in the DN2ID index table for each of the data entries, wherein a DN field of each of the data entry records of the DN2ID index table contains the attributes associated with one of the data entries, and wherein the storing of the DN2ID index table further comprises determining an entry ID for each of the data entries and storing the entry ID in a field of an corresponding one of the data entry records of the DN2ID index table;
operate the directory mapping tool to generate and store in memory a relational table associated with each object class defined for the information directory, wherein each record of each of the relational tables is linked to one or more of the data entry records in the DN2ID index table, wherein each of the records of the relational tables includes a field containing one of the entry IDs and includes a set of attribute fields defined by the corresponding object class and containing attribute values for the entry linked to the entry ID, and wherein the entry identifiers are primary keys for the relational tables; and
access the attribute values by querying the distinguished name (DN) fields of the data entry records in the DN2ID index table to identify a matching set of entry IDs, access one or more of the relational tables with at least a portion of the matching set of entry IDs, and retrieve the attribute values associated with the portion of the matching set of entry IDs.

24. The non-transitory computer-readable storage medium of claim 23, wherein the one or more non-transitory computer program products are configured to access the relational tables with Structured Query Language (SQL)-based queries.

25. The non-transitory computer-readable storage medium of claim 23, wherein an object classes field of each of the data entry records of the DN2ID index table comprises a plurality of the object classes associated with a corresponding one of the data entries of the tree structure.

26. The non-transitory computer-readable storage medium of claim 23, wherein the DN field comprises an accumulation of attributes of a corresponding one of the data entries of the tree structure.

27. The non-transitory computer-readable storage medium of claim 23, wherein the one or more non-transitory computer program products are configured to query the DN fields of the data entry records in the DN2ID index table to identify a matching set of entry IDs using Structured Query Language (SQL) commands.

28. A non-transitory computer-readable storage medium storing one or more non-transitory computer program products that are configured to:
provide a directory mapping tool;
access, with the directory mapping tool, an information directory in memory, the directory having a plurality of data entries at nodes of a tree structure and each of the data entries comprising a plurality of attributes;

store a distinguished name (DN2ID) index table in memory and operate the directory mapping tool to generate a record in the DN2ID index table for each of the data entries, wherein a distinguished name (DN) field of each of the data entry records of the DN2ID index table contains the attributes associated with one of the data entries, wherein the storing of the DN2ID index table further comprises determining an entry ID for each of the data entries and storing the entry ID in a field of an corresponding one of the data entry records of the DN2ID index table, and wherein the storing of the DN2ID index table further comprises determining a set of object classes associated with each of the data entries and storing the set of object classes in a field of each of the data entry records of the DN2ID index table; and operate the directory mapping tool to generate and store in memory a relational table associated with each object class defined for the information directory, wherein each record of each of the relational tables is linked to one or more of the data entry records in the DN2ID index table, and wherein the relational tables are selectively accessed using the set of object classes.

29. The non-transitory computer-readable storage medium of claim 28, wherein each of the records of the relational tables includes a field containing one of the entry IDs and includes a set of attribute fields defined by the corresponding object class and containing attribute values for the entry linked to the entry ID.

30. The non-transitory computer-readable storage medium of claim 29, wherein the entry IDs are primary keys for the relational tables.

31. The non-transitory computer-readable storage medium of claim 28, wherein the one or more non-transitory computer program products are configured to access the attributes by querying the distinguished name (DN) fields of the data entry records in the DN2ID index table to identify a matching set of entry IDs, access one or more of the relational tables with at least a portion of the matching set of entry IDs, and retrieve the attributes associated with the portion of the matching set of entry IDs.

32. The non-transitory computer-readable storage medium of claim 31, wherein the one or more non-transitory computer program products are configured to access the relational tables with Structured Query Language (SQL)-based queries.

\* \* \* \* \*